(12) United States Patent
Dore et al.

(10) Patent No.: US 10,891,784 B2
(45) Date of Patent: Jan. 12, 2021

(54) METHOD, APPARATUS AND STREAM FOR IMMERSIVE VIDEO FORMAT

(71) Applicant: InterDigital VC Holdings, Inc., Wilmington, DE (US)

(72) Inventors: Renaud Dore, Cesson-Sevigne (FR); Franck Galpin, Cesson-Sevigne (FR); Gerard Briand, Cesson-Sevigne (FR); Julien Fleureau, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/477,620

(22) PCT Filed: Jan. 8, 2018

(86) PCT No.: PCT/EP2018/050348
§ 371 (c)(1),
(2) Date: Jul. 12, 2019

(87) PCT Pub. No.: WO2018/130491
PCT Pub. Date: Jul. 19, 2018

(65) Prior Publication Data
US 2019/0371051 A1 Dec. 5, 2019

(30) Foreign Application Priority Data
Jan. 13, 2017 (EP) ..................................... 17305041

(51) Int. Cl.
*G06T 17/00* (2006.01)
*G06T 7/50* (2017.01)
(Continued)

(52) U.S. Cl.
CPC ................ *G06T 17/00* (2013.01); *G06T 7/50* (2017.01); *G06T 7/90* (2017.01); *G06T 2200/08* (2013.01);
(Continued)

(58) Field of Classification Search
None
See application file for complete search history.

(56) References Cited

U.S. PATENT DOCUMENTS 9,811,911 B2 * 11/2017 Mason ................... G06F 16/444
10,529,086 B2 * 1/2020 Jiang ....................... G06T 7/596
(Continued)

FOREIGN PATENT DOCUMENTS

WO WO 2012171477 12/2012

OTHER PUBLICATIONS

Kammerl, Julius, et al. "Real-time compression of point cloud streams." 2012 IEEE International Conference on Robotics and Automation. IEEE, 2012. (Year: 2012).*
(Continued)

*Primary Examiner* — Nurun N Flora
(74) *Attorney, Agent, or Firm* — Invention Mine LLC

(57) ABSTRACT

Method and device for generating a stream of data representative of a 3D point cloud. The 3D point cloud is partitioned into a plurality of 3D elementary parts. A set of two-dimensional 2D parametrizations is determined, each 2D parametrization representing one 3D part of the point cloud with a set of parameters. Each 3D part is represented as a 2D pixel image. A depth map and a color map are determined as a first patch atlas and a second patch atlas. A data stream is generated by combining and/or coding the parameters of the 2D parametrization, the first patch atlas, the second patch atlas and mapping information that links each 2D parametrization with its associated depth map and color map in respectively the first and second patch atlas.

18 Claims, 9 Drawing Sheets

(51) Int. Cl.
G06T 7/90 (2017.01)
H04N 19/597 (2014.01)
(52) U.S. Cl.
CPC ............ G06T 2207/10024 (2013.01); G06T 2207/10028 (2013.01); H04N 19/597 (2014.11)

(56) References Cited

U.S. PATENT DOCUMENTS

| | | | | |
|---|---|---|---|---|
| 2016/0050401 | A1* | 2/2016 | Gordon | G01C 3/02 |
| | | | | 348/744 |
| 2016/0134874 | A1 | 5/2016 | Konieczny et al. | |
| 2016/0253807 | A1 | 9/2016 | Jones et al. | |
| 2018/0262737 | A1* | 9/2018 | Monnier | G06T 7/70 |
| 2019/0122393 | A1* | 4/2019 | Sinharoy | G06K 9/6202 |
| 2019/0139266 | A1* | 5/2019 | Budagavi | G06T 17/20 |
| 2019/0311500 | A1* | 10/2019 | Mammou | G06T 9/001 |

OTHER PUBLICATIONS

Chen, Long, et al. "Transforming a 3-d lidar point cloud into a 2-d dense depth map through a parameter self-adaptive framework." IEEE Transactions on Intelligent Transportation Systems 18.1 (2016): 165-176. (Year: 2016).*

Zerman, Emin, et al. "Textured Mesh vs Coloured Point Cloud: A Subjective Study for Volumetric Video Compression." 2020 Twelfth International Conference on Quality of Multimedia Experience (QoMEX). IEEE, 2020. (Year: 2020).*

He Yuhang_etal_A novel way to organize 3D LiDAR point cloud as 2D depth map height map.pdf.

Tilo Ochotta_etal, "Compression of Point-Based 3D Models by Shape-Adaptive Wavelet Coding of Multi-Height Fields", First publ. in: Symposium on Point-Based Graphics 2004 : Zürich, Switzerland, Jun. 2-4, 2004 / [M. Alexa . . . . (eds.)].—Aire-la-Ville : Eurographics Association, 2004.—S. 103-112.—ISBN 3-905673-09-6.

Ziegler_etal_Multi-video-compression-in-texture-space.pdf.

Barrera_etal, "Piecewise Planar Decomposition of 3D Point Clouds Obtained from Multiple Static RGB-D Cameras", 2014 2nd International Conference on 3D Vision (3DV). Proceedings, , , 2014 2nd international Conference on 3D Vision (3DV), 2014.

Golla et al "Real-time Point Cloud Compression", 2015 IEEE/RSJ International Conference on Intelligent Robots and Systems (IROS), , , 2015 IEEE/RSJ International Conference on Intelligent Robots and Systems (IROS), 2015.

Tilo Ochotta et al, "Image-based surface compression", Erschienen in: Computer Graphics Forum ; 27 (2008), 6.—S. 1647-1663.

* cited by examiner

METHOD, APPARATUS AND STREAM FOR IMMERSIVE VIDEO FORMAT

This application claims the benefit, under 35 U.S.C. § 365 of International Application PCT/EP18/050348, filed Jan. 8, 2018, which was published in accordance with PCT Article 21(2) on Jul. 19, 2018 in English and which claims the benefit of European patent application No. 17305041.0 filed Jan. 13, 2017.

1. TECHNICAL FIELD

The present disclosure relates to the domain of immersive video content. The present disclosure is also understood in the context of the formatting of the data representative of the immersive content, for example for the rendering on end-user devices such as mobile devices or Head-Mounted Displays.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Display systems such as a head-mounted display (HMD) or a CAVE allow a user to browse into an immersive video content. The immersive video content may be obtained with CGI (Computer-generated imagery) techniques. With such immersive video content, it is possible to compute the content according to the point of view of the user watching it, but with unrealistic graphical quality. The immersive video content may be obtained with the mapping of a video (e.g. a video acquired by several cameras) on a surface such as a sphere or a cube. Such an immersive video content provides good image quality but issues related to the parallax, especially for objects of the scene of the foreground, i.e. close from the cameras, appear.

In the context of immersive video content, free-viewpoint video (FVV) is a technique for representation and coding of multi-view video and subsequent re-rendering from arbitrary viewpoints. While increasing the user experience in immersive context, the amount of data to be transported to the renderer is very important and may be an issue.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of generating a stream comprising data representative of an object of a scene, the method comprising:
  partitioning a three-dimensional point cloud in a plurality of three-dimensional parts each comprising at least a point of the three-dimensional point cloud, the three-dimensional point cloud representing the object as seen from a range of points of view;
  for each three-dimensional part of at least a part of the plurality of three-dimensional parts:
    determining a depth map associated with the three-dimensional part according to parameters representative of a two-dimensional parametrization associated with the three-dimensional part and data associated with the at least a point comprised in the three-dimensional part, the two-dimensional parametrization being responsive to geometric information associated with the at least a point and to pose information associated with the range of points of view; and
    determining a color map associated with the three-dimensional part according to the parameters and data associated with the at least a point comprised in the three-dimensional part;
  the plurality of determined depth maps being represented in a first patch atlas, each depth map corresponding to one patch of the first patch atlas, and the plurality of determined color maps being represented in a second patch atlas, each color map corresponding to one patch of the second patch atlas,
  generating the stream comprising the parameters representative of the two-dimensional parametrizations, data representative of the first patch atlas, data representative of the second patch atlas and a first mapping information representative of a mapping between the two-dimensional parametrizations and corresponding depth maps in the first patch atlas and corresponding color maps in the second patch atlas.

The present disclosure also relates to a device configured to generate a stream comprising data representative of an object of a scene, the device comprising a memory associated with at least one processor configured to:
  partition a three-dimensional point cloud in a plurality of three-dimensional parts each comprising at least a point of the three-dimensional point cloud, the three-dimensional point cloud representing the object as seen from a range of points of view;
  for each three-dimensional part of at least a part of the plurality of three-dimensional parts:
    determine a depth map associated with the three-dimensional part according to parameters representative of a two-dimensional parametrization associated with the three-dimensional part and data associated with the at least a point comprised in the three-dimensional part, the two-dimensional parametrization being responsive to geometric information associated with the at least a point and to pose information associated with the range of points of view; and
    determine a color map associated with the three-dimensional part according to the parameters and data associated with the at least a point comprised in the three-dimensional part;
  the plurality of determined depth maps being represented in a first patch atlas, each depth map corresponding to one patch of the first patch atlas, and the plurality of determined color maps being represented in a second patch atlas, each color map corresponding to one patch of the second patch atlas, generate the stream comprising the parameters representative of the two-dimensional parametrizations, data representative of the first patch atlas, data representative of the second patch atlas and a first mapping information representative of a mapping between the two-dimensional parametrizations and corresponding depth maps in the first patch atlas and corresponding color maps in the second patch atlas.

The present disclosure also relates to a device configured to generate a stream comprising data representative of an object of a scene, the device comprising:

means for partitioning a three-dimensional point cloud in a plurality of three-dimensional parts each comprising at least a point of the three-dimensional point cloud, the three-dimensional point cloud representing the object as seen from a range of points of view;

means for determining, for each three-dimensional part of at least a part of the plurality of three-dimensional parts:

a depth map associated with the three-dimensional part according to parameters representative of a two-dimensional parametrization associated with the three-dimensional part and data associated with the at least a point comprised in the three-dimensional part, the two-dimensional parametrization being responsive to geometric information associated with the at least a point and to pose information associated with the range of points of view; and a color map associated with the three-dimensional part according to the parameters and data associated with the at least a point comprised in the three-dimensional part;

the plurality of determined depth maps being represented in a first patch atlas, each depth map corresponding to one patch of the first patch atlas, and the plurality of determined color maps being represented in a second patch atlas, each color map corresponding to one patch of the second patch atlas, means for generating the stream comprising the parameters representative of the two-dimensional parametrizations, data representative of the first patch atlas, data representative of the second patch atlas and a first mapping information representative of a mapping between the two-dimensional parametrizations and corresponding depth maps in the first patch atlas and corresponding color maps in the second patch atlas.

According to a particular characteristic, a plurality of two-dimensional parametrizations is associated with each three-dimensional part of at least a part of the plurality of three-dimensional parts.

According to a specific characteristic, the stream further comprises a second mapping information representative of a mapping between an information identifying the three-dimensional patches and pixels of first and second images representative of respectively the first patch atlas and the second patch atlas.

According to a specific characteristic, the partitioning of said point cloud varies over time.

The present disclosure also relates to a stream carrying data representative of an object of a scene, wherein the data comprises:

parameters representative of two-dimensional parametrizations of three-dimensional parts of a point cloud representing the object as seen from a range of points of view, the parameters being obtained according to geometric information associated with points of the point cloud comprised in the three-dimensional parts and according to pose information associated with the range of points of view;

data representative of a first patch atlas comprising a plurality of depth maps each associated with one of the three-dimensional parts and determined from the parameters and data associated with the points of the point cloud comprised in the three-dimensional parts;

data representative of a second patch atlas comprising a plurality of color maps each associated with one of the three-dimensional parts and determined from the parameters and data associated with the points of the point cloud comprised in the three-dimensional parts; and a first mapping information representative of a mapping between the two-dimensional parametrizations, the depth maps in the first patch atlas and the color maps in the second patch atlas.

According to a particular characteristic, the stream further comprises a second mapping information representative of a mapping between an information identifying the three-dimensional patches and pixels of first and second images representative of respectively the first patch atlas and the second patch atlas.

The present disclosure also relates to a method of obtaining a point cloud representative of an object from a stream carrying data representative of the object, the method comprising:

obtaining, from the stream, parameters representative of two-dimensional parametrizations of three-dimensional parts of a point cloud representing the object as seen from a range of points of view;

obtaining, from the stream, data representative of a first patch atlas comprising a plurality of depth maps each associated with one of the two-dimensional parametrizations;

obtaining, from the stream, data representative of a second patch atlas comprising a plurality of color maps each associated with one of the two-dimensional parametrizations;

obtaining data associated with points of the point cloud representing the object from the parameters representative of the two-dimensional parametrizations, data of associated depth maps in the first patch atlas, data of associated color maps in the second patch atlas and first mapping information obtained from the stream and representative of a mapping between the two-dimensional parametrizations and corresponding depth maps and color maps in respectively the first patch atlas and the second patch atlas.

The present disclosure also relates to a device configured to obtain a point cloud representative of an object from a stream carrying data representative of the object, the device comprising a memory associated with at least one processor configured to:

obtain, from the stream, parameters representative of two-dimensional parametrizations of three-dimensional parts of a point cloud representing the object as seen from a range of points of view;

obtain, from the stream, data representative of a first patch atlas comprising a plurality of depth maps each associated with one of the two-dimensional parametrizations;

obtain, from the stream, data representative of a second patch atlas comprising a plurality of color maps each associated with one of the two-dimensional parametrizations;

obtain data associated with points of the point cloud representing the object from the parameters representative of the two-dimensional parametrizations, data of associated depth maps in the first patch atlas, data of associated color maps in the second patch atlas and first mapping information obtained from the stream and representative of a mapping between the two-dimensional parametrizations and corresponding depth maps and color maps in respectively the first patch atlas and the second patch atlas.

The present disclosure also relates to a device configured to obtain a point cloud representative of an object from a stream carrying data representative of the object, the device comprising:

means for obtaining, from the stream, parameters representative of two-dimensional parametrizations of three-dimensional parts of a point cloud representing the object as seen from a range of points of view;

means for obtaining, from the stream, data representative of a first patch atlas comprising a plurality of depth maps each associated with one of the two-dimensional parametrizations;

means for obtaining, from the stream, data representative of a second patch atlas comprising a plurality of color maps each associated with one of the two-dimensional parametrizations;

means for obtaining data associated with points of the point cloud representing the object from the parameters representative of the two-dimensional parametrizations, data of associated depth maps in the first patch atlas, data of associated color maps in the second patch atlas and first mapping information obtained from the stream and representative of a mapping between the two-dimensional parametrizations and corresponding depth maps and color maps in respectively the first patch atlas and the second patch atlas.

According to a particular characteristic, an image representative of the object is rendered according to the obtained data representative of the point cloud.

The present disclosure also relates to a computer program product comprising program code instructions to execute the steps of the method of generating a stream comprising data representative of an object of a scene, when this program is executed on a computer.

The present disclosure also relates to a computer program product comprising program code instructions to execute the steps of the method of obtaining a point cloud representative of an object from a stream carrying data representative of the object, when this program is executed on a computer.

The present disclosure also relates to a (non-transitory) processor readable medium having stored therein instructions for causing a processor to perform at least the above-mentioned method of generating a stream comprising data representative of an object of a scene, when this program is executed on a computer.

The present disclosure also relates to a (non-transitory) processor readable medium having stored therein instructions for causing a processor to perform at least the above-mentioned method of obtaining a point cloud representative of an object from a stream carrying data representative of the object, when this program is executed on a computer.

4. LIST OF FIGURES

The present disclosure will be better understood, and other specific features and advantages will emerge upon reading the following description, the description making reference to the annexed drawings wherein.

Figure 3:
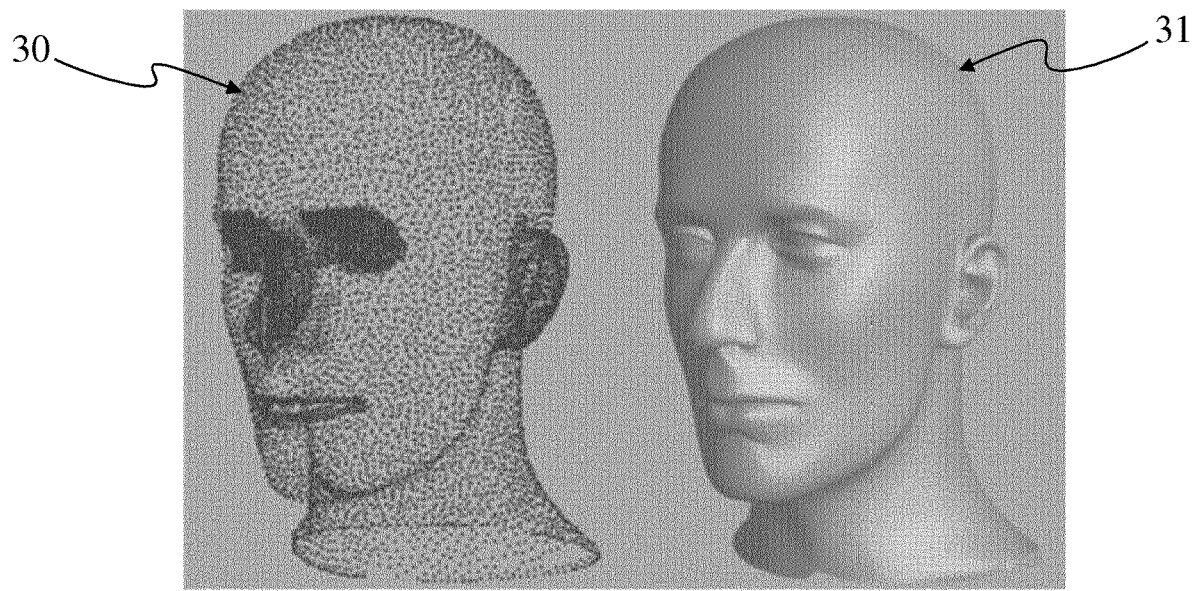
FIG. 3 shows representations of a part of an object of the scene acquired with the acquisition device of FIGS. 2A and 2B, according to a particular embodiment of the present principles.
Figure 9:
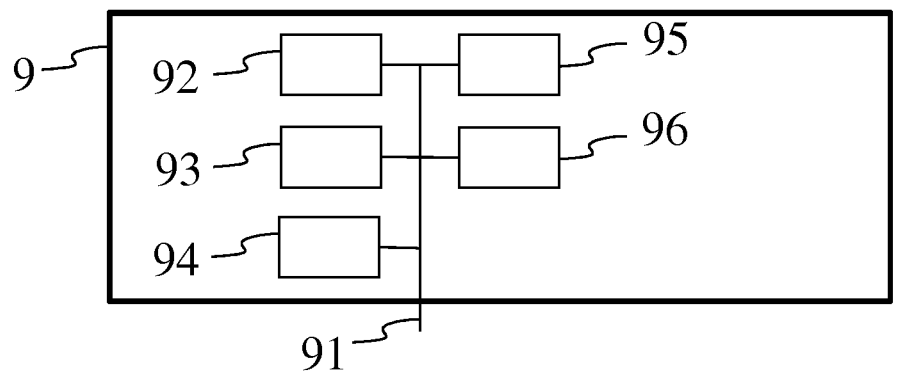
Figure 10:
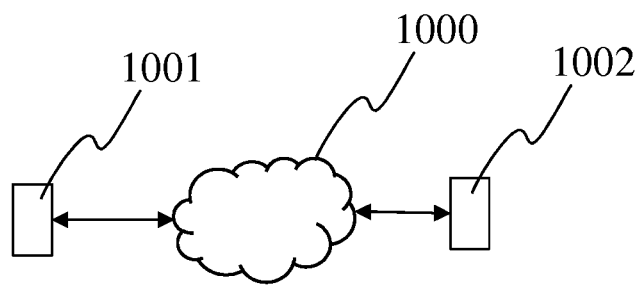
Figure 11:
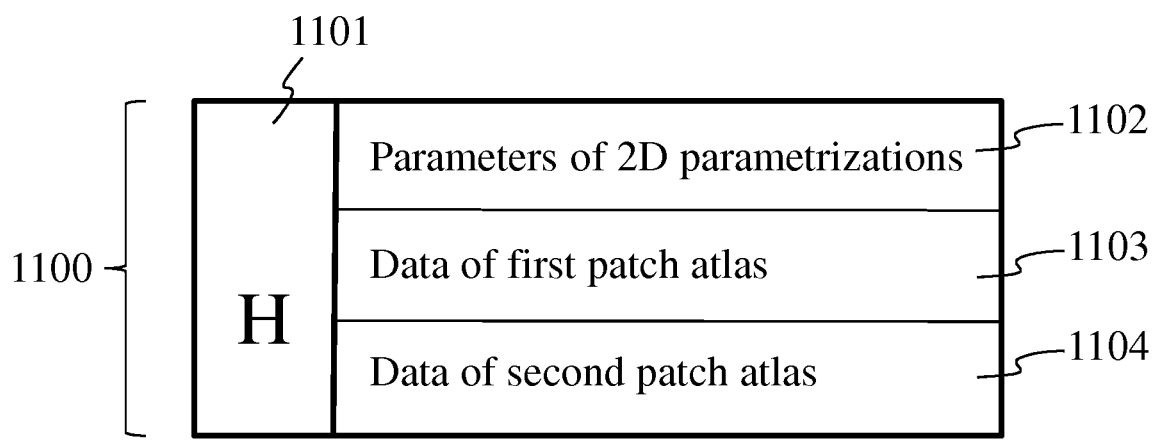
Figure 12:
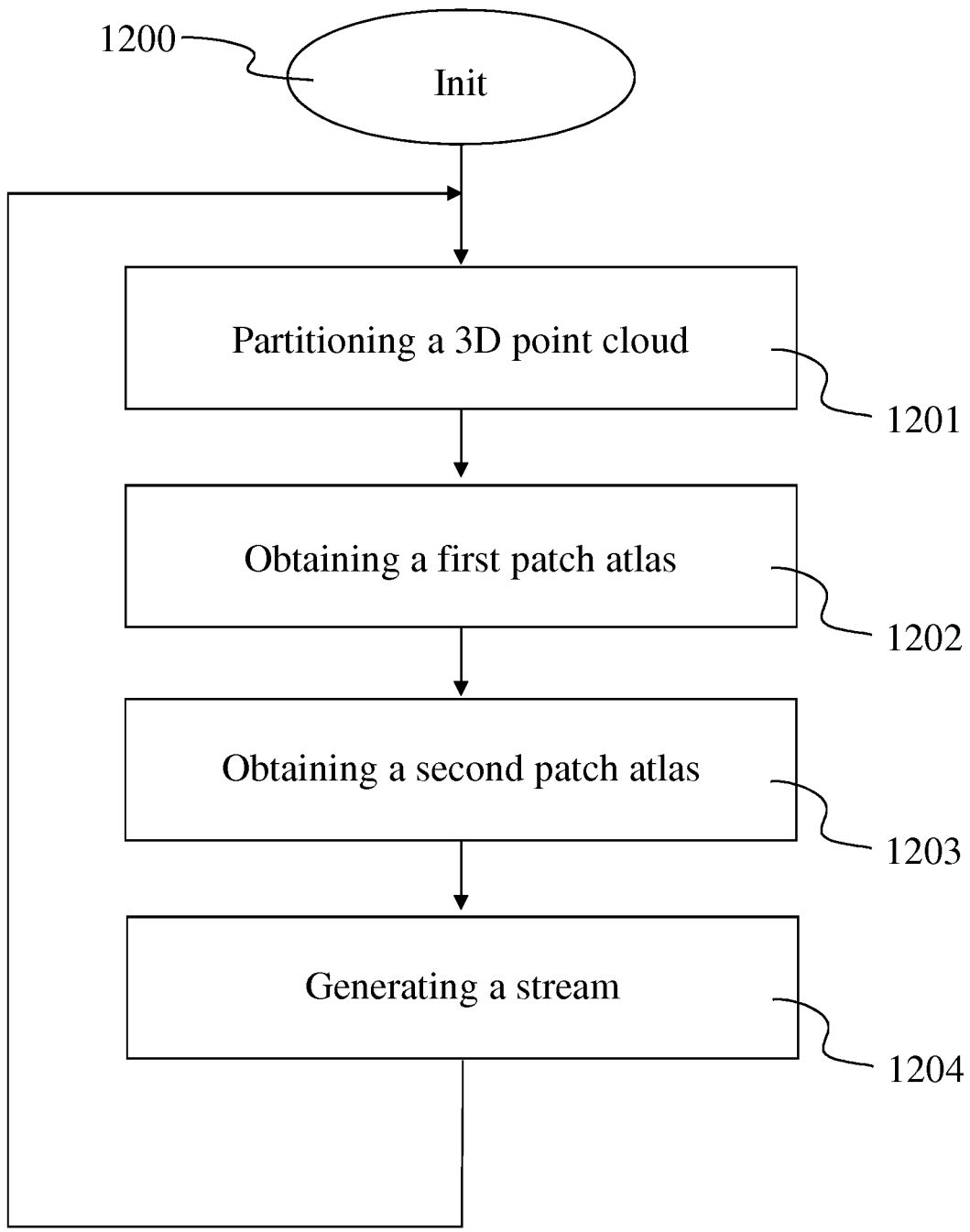
Figure 13:
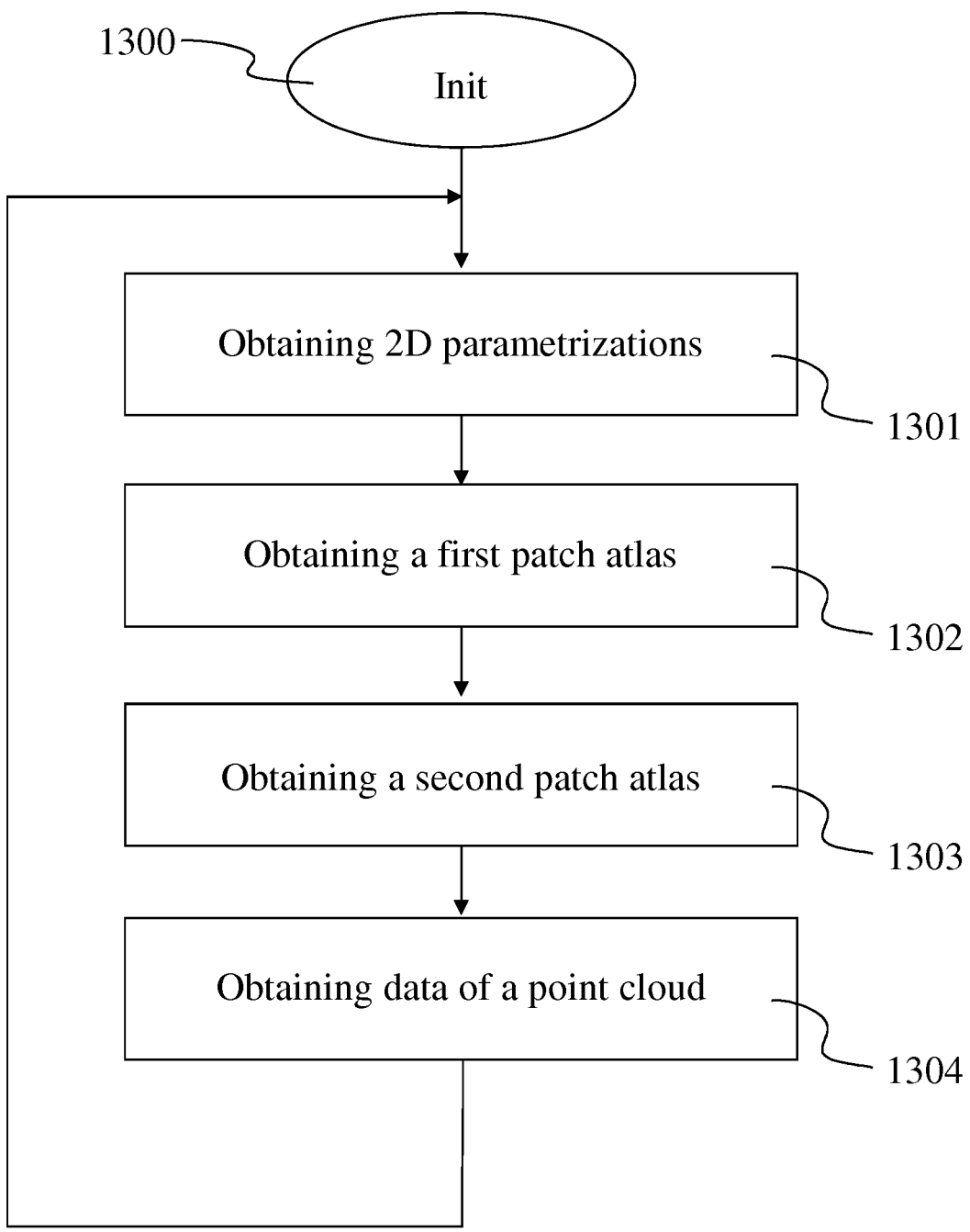

FIGS. 8A, 8B, 8C and 8D each shows a non-limiting example of the partitioning of the 3D representation of the object of FIG. 3;

FIG. 9 shows an example of an architecture of a device configured for implementing the method(s) of FIG. 12 and/or FIG. 13, in accordance with an example of the present principles;

FIG. 10 shows two remote devices of FIG. 9 communicating over a communication network, in accordance with an example of the present principles;

FIG. 11 shows the syntax of a signal carrying a description of the object of FIG. 3, in accordance with an example of the present principles;

FIG. 12 shows a method of generating a stream of data describing the object of FIG. 3, in accordance with an example of the present principles;

FIG. 13 shows a method of rendering an image of the object of FIG. 3, in accordance with an example of the present principles.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

The present principles will be described in reference to a particular embodiment of a method of generating a stream of data representative of one or more objects of a scene and/or of a method of rendering one or more images of this/these object(s) from the generated data stream. The object(s) of the scene is (are) represented with a three-dimensional (3D) point cloud according to a determined range of points of view. The point cloud is for example obtained from images of the scene, each image representing the scene or a part of it according to a different point of view within the determined range of points of view. The 3D point cloud is partitioned into a plurality of 3D elementary parts that each comprise one or more points of the 3D point cloud. A set of two-dimensional (2D) parametrizations is determined, each 2D parametrization representing one 3D part of the point cloud with a set of parameters. Each 3D part is represented with one or more 2D pixel representations via some parameters for each 2D pixel representation. A depth map (also called height map) and a color map (also called texture map) are determined for and associated with each 3D part using the parameters of the 2D parametrizations associated with each 3D part. The obtained depth maps are represented in a first patch atlas (a patch of the first patch atlas corresponding to one depth map) and the obtained color maps are represented in a second patch atlas (a patch of the second patch atlas corresponding to one color map). A data stream is generated by combining and/or coding the parameters of the 2D parametrization, the data representative of the first patch atlas, the data representative of the second patch atlas and mapping information that links each 2D parametrization with its associated depth map and color map in respectively the first and second patch atlas.

On the decoder/rendered side, the point cloud may be reconstructed by decoding/extracting from the stream the parameters of the 2D parametrizations and associated height and texture maps and one or more images of the object(s) may be rendered from the point cloud.

The use of a plurality of 2D parametrizations as references for representing the object with texture and height information enables to reduce the amount of data needed for representing the object in comparison to a representation with a point cloud while enabling to represent objects with complex topologies with an optimal level of details.

Figure 1:
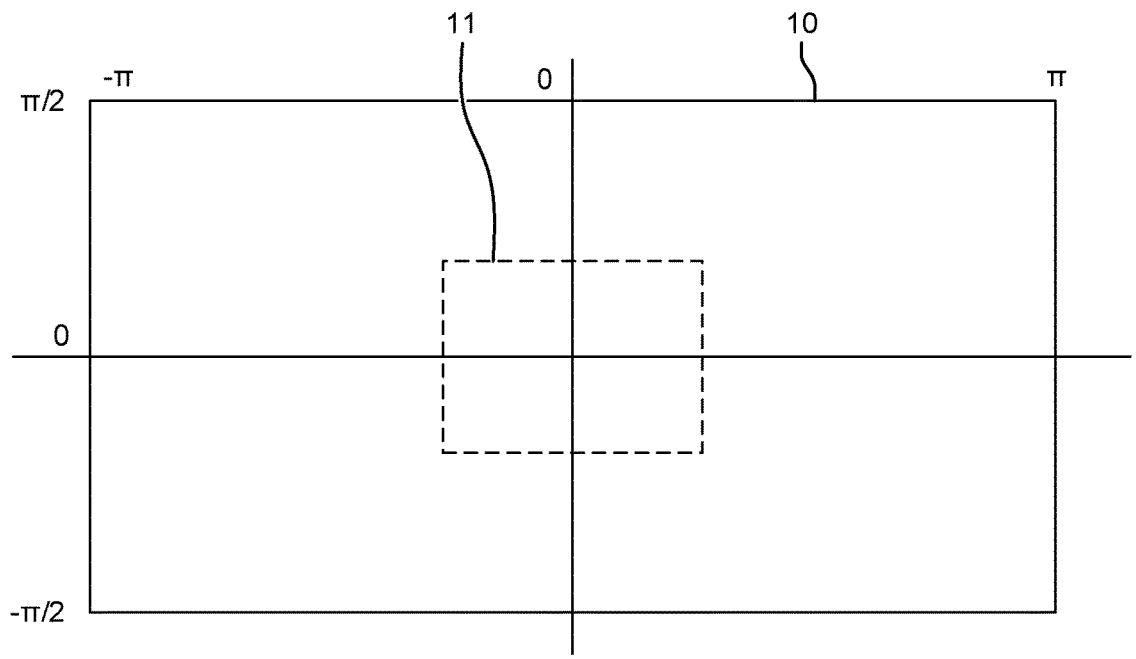
FIG. 1 shows an immersive content, according to a particular embodiment of the present principles.

FIG. 1 shows an example of an immersive content 10, in the non-limiting exemplary form of a 4π steradian video content, according to a particular and non-limitative embodiment of the present principles. FIG. 1 corresponds to a planar representation of the immersive content 10. The immersive content 10 corresponds for example to a real scene acquired with one or more cameras or to a mixed-reality scene comprising real and virtual objects, the virtual object being for example synthesized by using a 3D rendering tool. A part 11 of the immersive content 10 corresponds for example to the part of the immersive content displayed (called viewport) onto a display device adapted to visualize immersive contents, the size of the part 11 being for example equal to the field of view provided by the display device.

The display device used to visualize the immersive content 10 is for example a HMD (Head-Mounted Display), worn on the head of a user or as part of a helmet. The HMD advantageously comprises one or more display screens (for example LCD (Liquid Crystal Display), OLED (Organic Light-Emitting Diode) or LCOS (Liquid Crystal On Silicon)) and sensor(s) configured for measuring the change(s) of position of the HMD, for example gyroscopes or an IMU (Inertial Measurement Unit), according to one, two or three axes of the real world (pitch, yaw and/or roll axis). The part 11 of the immersive content 10 corresponding to the measured position of the HMD is advantageously determined with a specific function establishing the relationship between the point of view associated with the HMD in the real world and the point of view of a virtual camera associated with the immersive content 10. Controlling the part 11 of the video content to be displayed on the display screen(s) of the HMD according to the measured position of the HMD enables a user wearing the HMD to browse into the immersive content, which is larger than the field of view associated with the display screen(s) of the HMD. For example, if the field of view offered by the HMD is equal to 110° (for ex ample about the yaw axis) and if the immersive content offers a content of 180°, the user wearing the HMD may rotate his/her head to the right or to the left to see the parts of the video content outside the field of view offered by the HMD. According to another example, the immersive system is a CAVE (Cave Automatic Virtual Environment) system, wherein the immersive content is projected onto the walls of a room. The walls of the CAVE are for example made up of rear-projection screens or flat panel displays. The user may thus browse his/her gaze on the different walls of the room. The CAVE system is advantageously provided with cameras acquiring images of the user to determine by video processing of these images the gaze direction of the user. According to a variant, the gaze or the pose of the user is determined with a tracking system, for example an infrared tracking system, the user wearing infrared sensors. According to another variant, the immersive system is a tablet with a tactile display screen, the user browsing into the content by scrolling the content with one or more fingers sliding onto the tactile display screen.

The immersive content 10 and the part 11 as well may comprise foreground object(s) and background object(s).

Naturally, the immersive content 10 is not limited to a 4π steradian video content but extends to any video content (or audio-visual content) having a size greater than the field of view 11. The immersive content may be for example a 2π, 2.5 π, 3π steradian content and so on.

Figure 2A:
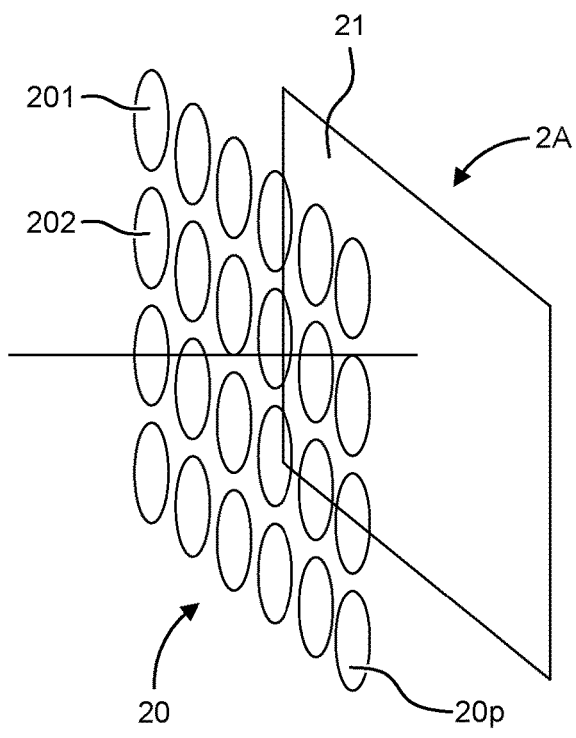
FIGS. 2A and 2B show a lightfield acquisition device configured to acquire images of a scene [or of a part of the scene] for obtaining at least a part of the immersive content of FIG. 1, according to a particular embodiment of the present principles.
Figure 2B:
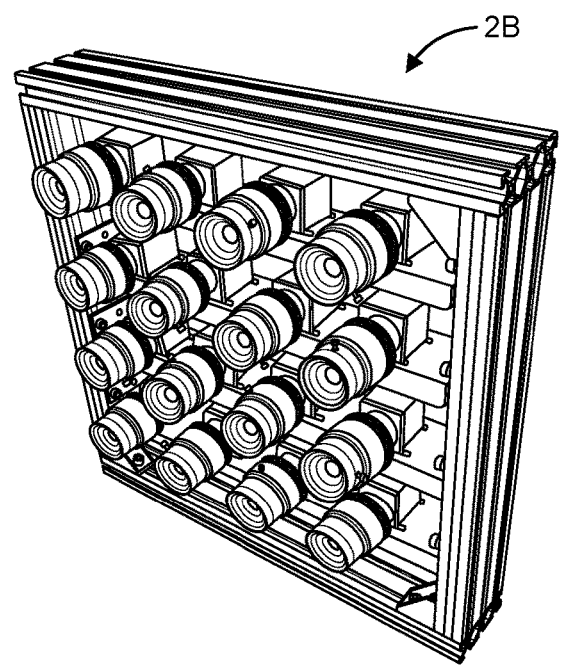

FIGS. 2A and 2B show an example of a lightfield acquisition device. More specifically, FIGS. 2A and 2B each show a camera array 2A, 2B (also called camera arrays), according to two particular embodiments of the present principles.

The camera array 2A comprises an array 20 of lenses or micro-lenses comprising several micro-lenses 201, 202 to 20p with p being an integer corresponding to the number of micro-lenses, and one or several sensor arrays 21. The camera array 2A does not include a main lens. The array of lenses 20 may be a small device, which is commonly named a micro-lens array. The camera array with a single sensor can be considered as a special case of plenoptic camera where the main lens has an infinite focal length. According to a particular arrangement wherein the number of photosensors is equal to the number of micro-lenses, i.e. one photosensor is optically associated with one micro-lens, the camera array 20 may be seen as an arrangement of a plurality of individual cameras (for example micro-cameras) closely spaced, such as a square arrangement (as illustrated in FIG. 2A) or a quincunx arrangement for example, or non flat arrangement for example on a cylindrical surface.

The camera array 2B corresponds to a rig of individual cameras each comprising a lens and a photosensor array. The cameras are spaced apart by, for example, a distance equal to a few centimetres or less or 5, 7 or 10 cm.

The lightfield data (forming a so-called lightfield image) obtained with such a camera array 2A or 2B corresponds to the plurality of views of the scene, i.e. to the final views that may be obtained by demultiplexing and demosaicing a raw image obtained with a plenoptic camera such as the plenoptic camera of the type 1.0, corresponding to a plenoptic camera wherein the distance between the lenslet array and the photosensor array is equal to the microlenses focal length, or of the type 2.0 otherwise (also called focused plenoptic camera). The cameras of the camera array 2B are calibrated according to any known method, i.e. intrinsic and extrinsic parameters of the cameras are known.

The different views obtained with the lightfield acquisition device enable to obtain an immersive content or at least a part of the immersive content with use of algorithms able to compute depth for example based on disparity. Naturally, the immersive content may be obtained with acquisition device different from a lightfield acquisition device, for example with a camera associated with a depth sensor (e.g. an infra-red emitter/receiver such as the Kinect of Microsoft or with a laser emitter).

FIG. 3 shows two different representations of an object, or part of it, of the scene represented with the immersive content. According to the example of FIG. 3, the object is a person, for example moving within the scene, and a part of the object corresponding to the head is illustrated in FIG. 3.

A first representation 30 of the part of the object is a point cloud. The point cloud corresponds to a large collection of points representing the object, e.g. the external surface or the external shape of the object. A point cloud may be seen as a vector based structure, wherein each point has its coordinates (e.g. three-dimensional coordinates XYZ, or a depth/distance from a given point of view) and one or more attributes, also called component. An example of component is the color component that may be expressed in different color spaces, for example RGB (Red, Green and Blue) or YUV (Y being the luma component and UV two chrominance components). The point cloud is a representation of the object as seen from a given point of view, or a range of point of views. The point cloud may be obtained of different ways, e.g.:
  from a capture of a real object shot by a rig of cameras, as the camera arrays of FIG. 2, optionally complemented by depth active sensing device;
  from a capture of a virtual/synthetic object shot by a rig of virtual cameras in a modelling tool;
  from a mix of both real and virtual objects.

In the first case (from the capture of a real object), the set of cameras generates a set of images or sequences of images (videos) corresponding to the different views (different points of view). The depth information—meaning the distance from each camera center to the object surface—is obtained either by means of active depth sensing device, e.g., in infrared range and based on structured light analysis or time of flight, or based on disparity algorithms. In both cases, all cameras need to be calibrated, intrinsically and extrinsically. The disparity algorithms consists on a search of similar visual features on a pair of rectified camera images, typically to be made along a 1-dimension line: the larger the pixel column difference, the closer the surface of this feature. In the case of a camera array, the global depth information may be obtained from the combining of a plurality of peer disparity information, taking benefit of the plurality of camera pairs, therefore improving the signal over noise ratio.

In the second case (synthetic object), the modelling tool provides directly the depth information.

A second representation 31 of the part of the object may be obtained from the point cloud representation 30, the second representation corresponding to a surface representation. The point cloud may be processed in order to compute its surface. For that purpose, for a given point of the point cloud, the neighboring points of this given point are used in order to compute the normal to the local surface at this given point, the surface element associated with this given point being derived from the normal. The process is reiterated for all points to obtain the surface. Methods for reconstructing the surface from a point cloud are for example described by Matthew Berger et al. in "*State of the Art in Surface Reconstruction from Point Clouds*", State of the Art Report, 2014. According to a variant, the surface element associated with a given point of the point cloud is obtained by applying splat rendering to this given point. The surface of the object (also called implicit surface or external surface of the object) is obtained by blending all the splats (e.g., ellipsoids) associated with the points of the point cloud.

In a particular embodiment, the point cloud represents only partial views of the object, and not the object in its totality, and this corresponds to the way how the object is supposed to be watched at the rendering side, for example in a cinematographic scene. For example, the shooting of a character facing a flat camera array generates a point cloud on the side of the rig only. The back of the character does not even exist, the object is not closed on itself, and the geometric characteristics of this object is therefore the set of all the surfaces oriented in the direction of the rig (the angle between the normal of each local surfaces and the ray back to the acquisition device is for example less than 90°).

Figure 4:
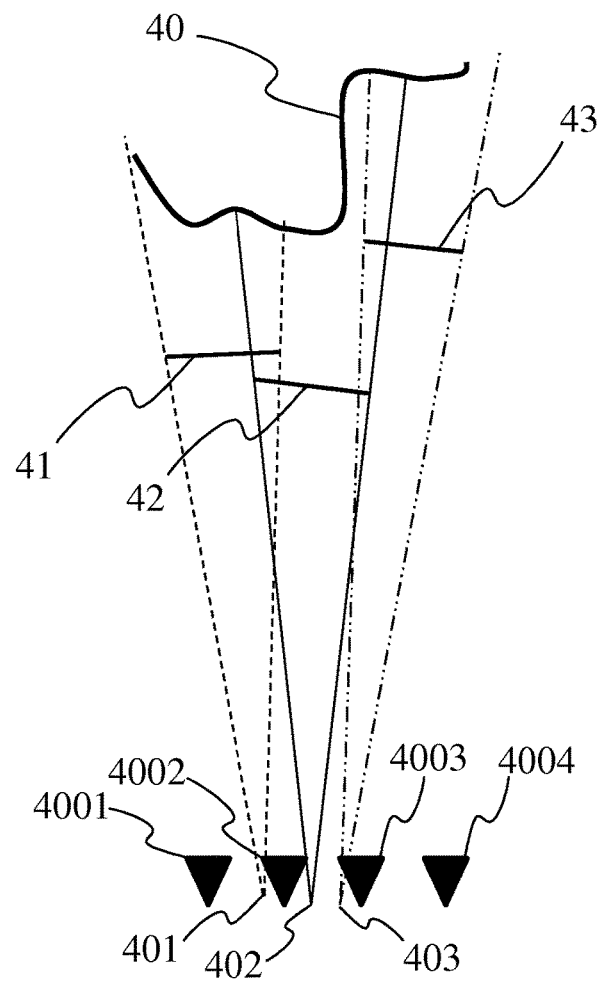
FIG. 4 shows 2D parametrizations associated with 3D parts of the representation of the object of FIG. 3, according to a particular embodiment of the present principles.

FIG. 4 shows 2D parametrizations 41, 42 and 43 associated with 3D parts of the representation 40 of the object of the scene that has been acquired with the cameras 4001, 4002, 4003 and 4004, according to a particular embodiment of the present principles. The cameras 4001 to 4004 correspond for example to some of the cameras of the rig of FIG. 2B. The object is represented with its surface 40 as in the example 31 of FIG. 3 but may be represented with the point cloud itself as in the example 30 of FIG. 3. Each 2D parametrization is associated with a 3D part of the representation of the object, each 3D part corresponding to a volume comprising one or more points of the point cloud. Each 2D parametrization is determined by taking into account pose information of the acquisition device in a way as to browse a maximum number of points (generated by the range of points of view of the acquisition device) of the point cloud comprised in the 3D part associated with said each 2D parametrization. When the 2D parametrization is obtained with a linear perspective projection of the points of the associated 3D part, a determined point of view is associated with each 2D parametrization, each point of view being comprised within a range of points of view that corresponds to the range of points of view used for acquiring the scene. The 2D parametrization 41 is associated with the point of view 401, the 2D parametrization 42 is associated with the point of view 402 and the 2D parametrization 43 is associated with the point of view 403. As can be seen on FIG. 4, each of the points of view 401 to 403 is located between the points of view 4001 and 4002 corresponding to respectively the left limit 4001 and the right limit 4004 of the range of points of view of the acquisition device. The point cloud is obtained from a limited and determined range of points of view and the 2D representations (i.e. the 2D parametrizations) of the 3D parts of the point cloud are all seen from a point of view that is located within the limited and determined range of points of view used to obtain the point cloud. Each 2D parametrization is a 2D representation of the 3D part of the point cloud it is associated with. A same 3D part may be represented with one or several 2D parametrizations, e.g. with 2, 3 or more 2D parametrization. As discussed hereinabove, a 2D parametrization associated with one given 3D part of the point cloud corresponds to a browsing in 2 dimensions of the given 3D part of the point cloud allowing to sample the given 3D part, i.e. a 2D representation of the content (i.e. the point(s)) of this given 3D part comprising a plurality of samples, the number of which depending from the sampling step that is applied. A 2D parametrization may be obtained in different ways, for example by implementing any one of the following methods:

- linear perspective projection of the points of the 3D part of the point cloud onto a plane associated with a point of view, the parameters representative of the linear perspective projection comprising the location of the virtual camera, the spatial sampling step and the field of view in the 2 dimensions;
- orthographic projection of the points of the 3D part of the point cloud onto a surface, the parameters representative of the orthographic projection comprising the geometry (shape, size and orientation) of the projecting surface and spatial sampling step;
- LLE (Locally-Linear Embedding) that corresponds to a mathematical operation of dimension reduction, here applied to convert/transform from 3D to 2D, the parameters representative of the LLE comprising the transformation coefficients.

The 2D parametrizations 41, 42 and 43 may be represented with a limited number of parameters and defined for example with one or more parametric equations. The 2D parametrization associated with a given 3D part of the point cloud is determined by taking into account the geometric characteristic of the given 3D part (e.g. extreme points of the given 3D part and/or normal information associated with elements of the external surface of the part of the object comprised in the given 3D part that is obtained from the points located within the 3D part) and the pose information of the acquisition device(s) (e.g. for orienting the 2D parametrization). Taking into account the geometric characteristic of the 3D part and the pose information enables to obtain a 2D parametrization located in the space facing the 3D part, i.e. a 2D parametrization located between the acquisition devices and the point cloud.

As can be seen on FIG. 4, the 2D parametrizations 41, 42 and 43 may overlap each other, the overlapping being for example due to the overlapping of the 3D parts the 2D parametrizations are associated with.

Figure 5:
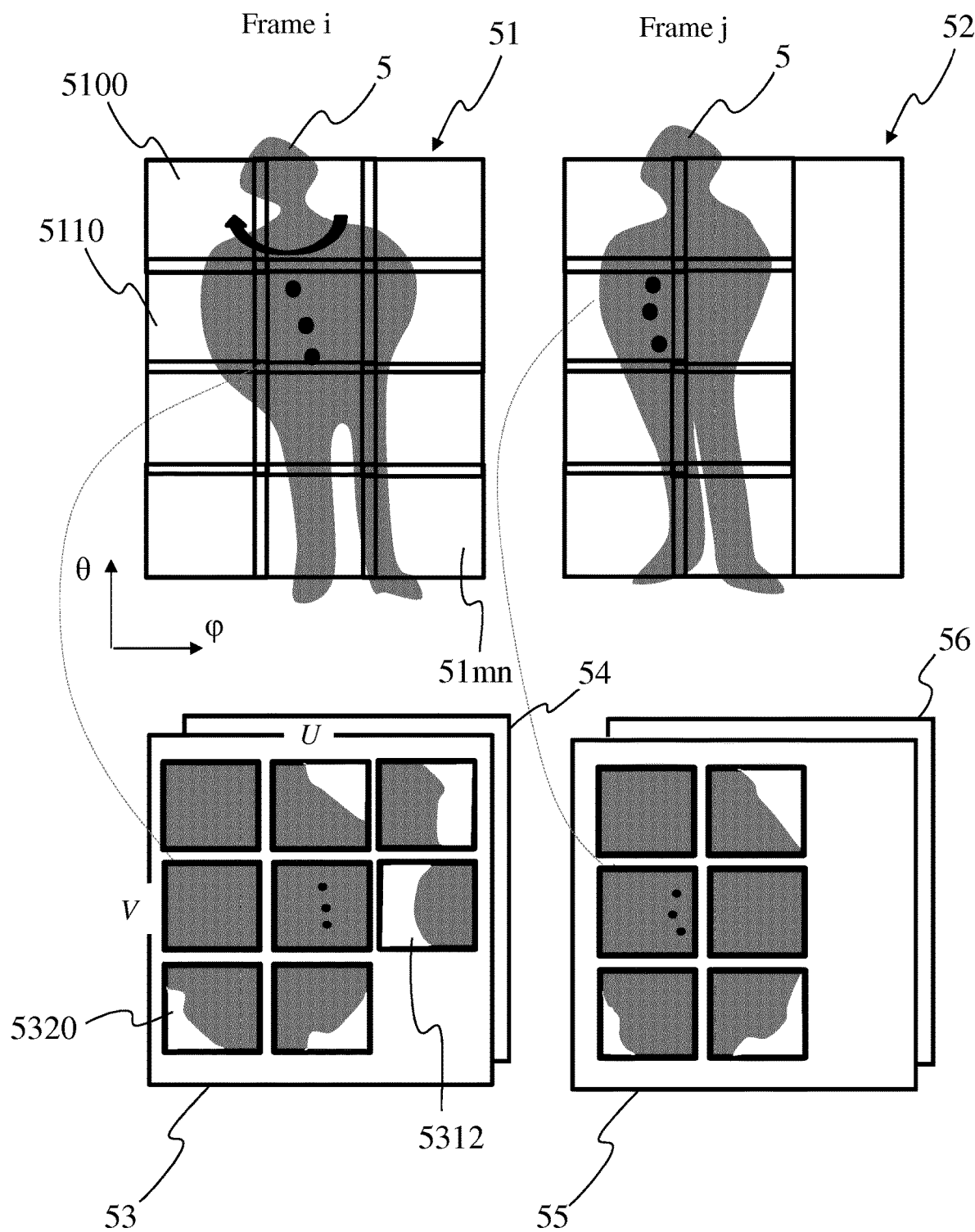
FIGS. 5 and 6 show patch atlas associated to the 3D parts of FIG. 4, according to particular embodiments of the present principles.
Figure 8A:
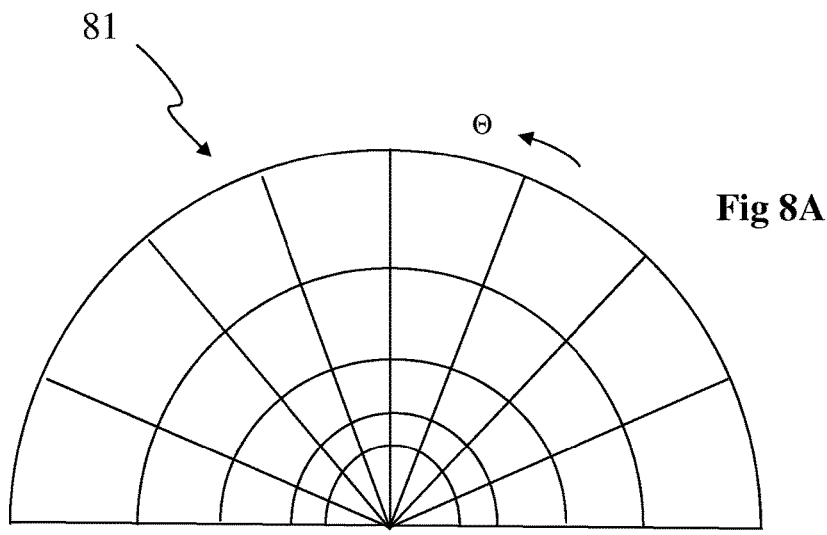
Figure 8B:
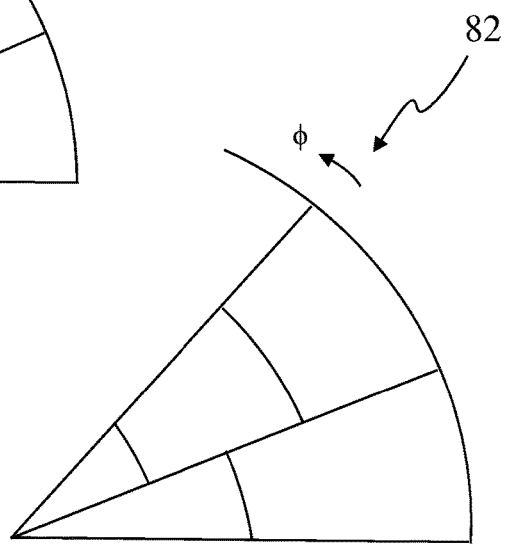
Figure 8C:
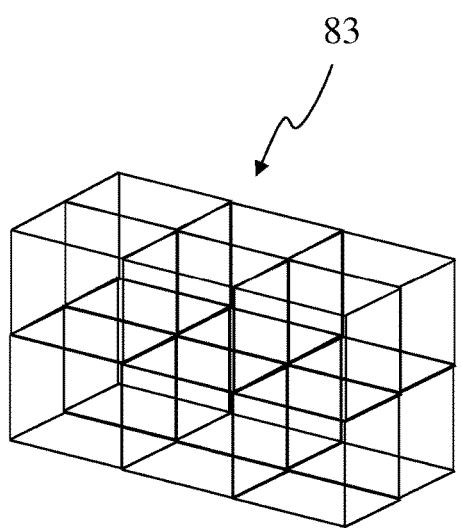
Figure 8D:
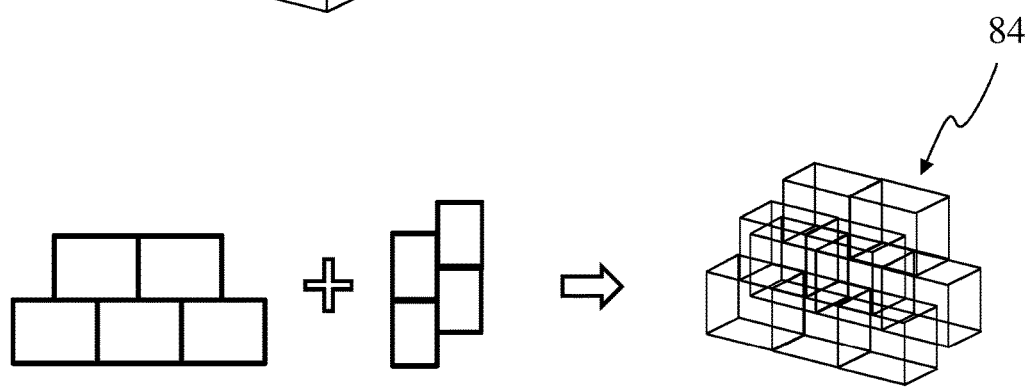

To obtain the 3D parts, the point cloud may be partitioned according to different methods. For example, the point cloud may be partitioned according to the examples of FIGS. 8A to 8D. According to the non-limiting example of FIG. 8A, the 3D space 81 (e.g. a half-sphere) occupied by the point cloud is partitioned according to spherical coordinates (r, θ, φ), i.e. according to a distance 'r' corresponding to the radius of the half-sphere and to the angles 'θ' and 'φ', each dimension 'r', 'θ' and 'φ' being partitioned evenly. According to a variant, one or more of the dimensions 'r', 'θ' and/or 'φ' may vary, for example the depth of the 3D parts may vary with the dimension 'r'. According to a variant, the size of each 3D part is determined to uniformly distribute the points of the point cloud into the 3D parts, the size of the 3D points depending from the local density of the points in the different areas of the space occupied by the point cloud. In the example of FIG. 8B, the 3D space 82 (e.g. a half-sphere) occupied by the point cloud is partitioned according to spherical coordinates (r, θ, φ) in a staggered way. In the examples of FIGS. 8A and 8B, the 3D parts may be seen as view camera frustum volumes. According to the non-limiting example of FIG. 8C, the 3D space 83 (e.g. a parallelepiped corresponding to a box bounding the point cloud) occupied by the point cloud is partitioned according to Cartesian coordinates (x, y, z), i.e. according to the 3 dimensions of a 3D Cartesian frame of reference. Each 3D part may have the form of a cube or of a rectangle parallelepiped. Each 3D part may have the same size or the 3D parts may be of different size, for example to uniformly distribute the points into all 3D parts. FIG. 8D shows a variant of the partitioning of FIG. 8C wherein the parallelepiped are distributed in a staggered way within the 3D space 84 occupied by the point cloud. Even if not illustrated on FIGS. 8A, 8B, 8C and 8D, the 3D parts resulting from the partitioning of the point cloud may overlap each other in part, meaning that some parts of the space of the point cloud may belong to several 3D parts. The partitioning of the point cloud may be fixed or may vary over the time. For example, the partitioning of the point cloud may vary from a GOP (Group Of Pictures) to another GOP. When applied in the context of MPEG-DASH (Dynamic Adaptive Streaming over HTTP), the partitioning may vary from a segment to another segment, and in the frame of a ISOBMFF standard, this segment may be an ISOBMFF segment, FIG. 5 shows the association of depth maps and color maps with the 3D parts of the point cloud for a frame i and for a frame j located temporally after the frame i, according to a non-limiting example of the present principles. The 3D point cloud representing the object 5 (a person in the example of FIG. 5) is illustrated in shades of grey. The partitioning 51 of the object 5 corresponds to the example of FIG. 8A, i.e. a partitioning according to spherical coordinates, with partial overlap between neighboring 3D parts. For sake of clarity, the point cloud and its partitioning are represented in 2D, according to θ and φ only. The 3D parts resulting from the partitioning are illustrated with squares 5100, 5110, 51mn arranged in a matrix fashion, wherein 'm' corresponds to the row index and 'n' corresponds to the column index. For example, the reference number 5100 points to the square belonging to the row with index '0' and to the column with index '1' and the reference number 5110 points to the square belonging to the row with index '1' and to the column with index '0'. One depth map is associated with each 3D part of the point cloud 5. In a same way, one color map is associated with each 3D part of the point cloud 5.

A depth map associated with a given 3D part, for example the 3D part 5110, is obtained by using the parameters of the 2D parametrization associated with the given 3D part 5110 and the depth map 5320 is obtained by using the parameters of the 2D parametrization associated with the 3D part 5320. For example, when the 2D parametrization corresponds to a linear perspective projection, the parameters representative of the 2D parametrization are the location of the point of view (i.e. the virtual camera location) (that may be for example obtained from the normal associated with the points of the point cloud comprised in the 3D part) and the horizontal and vertical field of view. Depth information to be stored in the depth map corresponds to the distances between the virtual camera location in the case of linear perspective or the 2D projection surface in the case of orthographic projection and the points of the point cloud comprised in the 3D part along rays starting from the point of view in the case of linear perspective or orthogonal to the projection surface in the case of orthographic projection and ending at the points of the point cloud comprised in the 3D part, knowing the coordinates of the points and the coordinates of the point of view (in the case of a linear perspective projection) in world space for example. When the object is represented with its implicit surface obtained from the points of the point cloud, the distances to be stored in the depth map correspond to the distances between the intersections between the rays and the 2D parametrization surface on one hand and the intersections between the rays and the implicit surface on the other hand. The number of depth information may depend on the resolution of the 2D parametrization surface that depends from the sampling step size. A depth map is for example obtained by applying the splat rendering technique, i.e. the depth value associated with a point is assigned to the sample of the 2D parametrization surface associated with this point (this sample depending from the type of 2D parametrization that is used, e.g., linear perspective projection, orthographic projection or LLE) and also to the samples located in the neighborhood of the crossed sample (these samples forming a splat). According to a variant, the depth map is obtained by applying ray tracing technique, i.e. by launching rays from the samples of the 2D parametrization surface and by assigning to a given sample the depth value that corresponds to the depth value associated with the point that is intersected by the ray launched from this given sample (or the point the closest to the ray).

The coding of depth information may vary from a depth map to another one in the first patch atlas 53. For example, the coding of depth information for a given depth map may be adapted to the range of depth values for the 3D part associated with the given depth map and/or to the number of points comprised in the 3D part. For example, depending on the minimal depth value and maximal depth value computed for the 3D part, the coding of the depth information in the corresponding depth map is determined to be adapted to the difference between these minimal and maximal values. If the difference is small, the depth information may for example be coded on 8 or 10 bits and if the difference is great, the depth information may for example be coded on 12, 14 or more bits. Varying the coding from a depth map to another one enables to optimize the bit rate coding. According to a variant, the depth information is coded on a same bit depth (e.g. 8, 10, 12 or 14 bits) for each 3D map, whatever the difference between the minimal and maximal depth value, but by taking into account the minimal and maximal values. Such a variant enables decreasing the quantification step when the difference is small which enables to decrease the quantification noise associated with the coding of the depth information.

In a same way, a color map associated with the given 3D part is obtained by using the parameters of the 2D parametrization associated with the given 3D part. Color information retrieved from the points of the point cloud comprised in the given 3D part or color information retrieved from the implicit surface of the object intersected by the rays casted from the point of view is associated with the samples of the 2D parametrization surface to form the color map. As for the depth maps, a color map is for example obtained by applying the splat rendering technique, i.e. the color value(s) associated with a point is assigned to the sample of the 2D parametrization surface associated with this point (this sample depending from the type of 2D parametrization that is used, e.g., linear perspective projection, orthographic projection or LLE) and also to the samples located in the neighborhood of the crossed sample (these samples forming a splat). According to a variant, the color map is obtained by applying ray tracing technique, i.e. by launching rays from the samples of the 2D parametrization surface and by assigning to a given sample the color value that corresponds to the color value associated with the point that is intersected by the ray launched from this given sample (or the point the closest to the ray). As for the depth information, the coding of color information for a given color map may be adapted to the range of color values for the 3D part associated with the given color map and/or to the number of points comprised in the 3D part. For example, depending on the minimal color value and maximal color value computed for the 3D part, the coding of the color information in the corresponding color map is determined to be adapted to the difference between these minimal and maximal values. If the difference is small, the color information may for example be coded on 8 or 10 bits and if the difference is great, the color information may for example be coded on 12, 14 or more bits. Varying the coding from a color map to another one enables to optimize the bit rate coding. According to a variant, the color information is coded on a same bit depth (e.g. 8, 10, 12 or 14 bits) for each color map, whatever the difference between the minimal and maximal color value, but by taking into account the minimal and maximal values. Such a variant enables to decrease the quantification step when the difference is small which enables to a higher color dynamic range or higher luminance range, which may be used to obtain a HDR (High Dynamic Range) representation of the object represented with the point cloud.

The set of obtained depth maps are arranged in a first patch atlas 53 according to a determined or random arrangement, for example in a matrix fashion with rows and columns, wherein a patch of the first patch atlas 53 corresponds to one depth map. For example, the patch 531 is the depth map associated with the 3D part 5110.

In a same way, the set of obtained color maps are arranged in a second patch atlas 54, for example according to a same arrangement as the depth maps in the first patch atlas 53.

A first mapping information may be generated to keep the connection between a 2D parametrization and the associated depth map and color map in respectively the first and second patch atlas. The first mapping information may for example be of the form of:

{parameters of the 2D parametrization; depth map ID; color map ID} wherein the depth map ID may be an integer value or a pair of values comprising the column index U and the row index V the depth map belongs to in the matrix of patches of the first patch atlas; the color map ID may be an integer value or a pair of values comprising the column index U' and the row index V' the color map belongs to in the matrix of patches of the second patch atlas.

When the depth maps and the color maps are arranged according to a same arrangement in the first patch atlas and the second patch atlas, the depth map ID and the color map ID are the same and the first mapping information may be for example of the form of:

{parameters of the 2D parametrization; depth and color maps ID} wherein 'depth and color maps ID' identifies both depth map in the first patch atlas and the color map in the second map atlas, either via a same integer value associated with both depth and color maps or via the pair of values column index U and row index V the depth and color maps belong in respectively the first patch atlas and the second patch atlas.

The same mapping information is generated for each 2D parametrization and associated depth and color maps. Such a first mapping information enables to reconstruct the point cloud by establishing the association of the 2D parametrization with corresponding depth and color maps. If the 2D parametrization is a projection, the point cloud may be reconstructed by de-projecting (performing the inverse projection) the depth information comprised in the associated depth map and the color information in the associated color map. The first mapping information then corresponds to a list of mapping information:

{parameters of the 2D parametrization; depth and color maps ID}$_i$,

For i=1 to n, with n the number of 2D parametrizations.

The first patch atlas 53 and the second patch atlas may be seen as images with same resolution, i.e. with a same number of pixels arranged in a matrix fashion with K columns and L rows, K and L being integer. Each patch (corresponding to either a depth map for the first patch atlas 53 or to a color map for the second patch atlas 54) comprises a subset of pixels of the image representing either the first patch atlas 53 or the second patch atlas.

According to an optional variant, a second mapping information may be associated with the pixels of the images representing either the first patch atlas 53 or the second patch atlas 54, the second mapping information being advantageously common to the image representing the first patch atlas 53 and to the image representing the second patch atlas 54, the resolution being the same for both images and the patches referring to a same 2D parametrization being organized according to a same arrangement in both first and second patch atlas. The second mapping information indicates to which 2D parametrization each pixel or each group of pixels of the image representing the first patch atlas (or the second patch atlas) refers to or is associated with. To reach that aim, an identification information is associated with each 2D parametrization (for example an integer value different for each 2D parametrization). The second mapping information may for example be of the form a map of cells arranged in rows and columns, each cell corresponding to a pixel or to a group of pixels of the image and comprising the identification information of the corresponding 2D parametrization. According to another example, the second mapping information corresponds to a list, for example of the following form:

{3D part Identification; pixel/group of pixels identification}, for each pixel or each group of pixels of the image representing the first/second patch atlas. The second mapping information enables to speed up the decoding of the information at decoder/rendered side by easing by easing the retrieving of the identification information associated with each 3D part, which should occur for each pixel of the image. Typical implementation of the decoder requires the parallel implementation of this retrieving for each pixel of the image on a GPU (Graphical Processing Unit) which has to avoid browsing a list. According to this optional variant, this second mapping information is an image typically with lower resolution than the color and depth image where each pixel gives directly the identification information associated with each 3D part the pixel/point belongs to.

The partitioning of the object 5 may vary over time, for example from a GOP to another following GOP, or when a change in the topology of the object 5 has been changed or every q frames, with q an integer greater than or equal to 1. Such a variation in the partitioning is illustrated in FIG. 5 with the frame j. The partitioning 52 of the object 5 at frame j is different from the partitioning 51 of the same object 5 at frame i. In the example of FIG. 5, the topology of the object 5 at frame j is different from the topology of the object 5 at frame i. Frame j may for example belongs to a GOP that temporally follows the GOP comprising the frame i. A first patch atlas 55, comprising depth maps associated with the 3D parts and corresponding 2D parametrizations, is obtained using the parameters representative of the 2D parametrizations associated with the 3D parts resulting from the partitioning and from the data representative of the geometry (e.g. coordinates) of the points comprised in the 3D parts, as described with regard to frame i. As the number of 3D parts resulting from the partitioning 52 is less than the number of 3D parts resulting from the partitioning 51, the number of depth maps in the first patch atlas 55 is less than the number of depth maps comprised in the first patch atlas 53. In a same way, a second patch atlas 56, comprising color maps associated with the 3D parts and corresponding 2D parametrizations, is obtained using the parameters representative of the 2D parametrizations associated with the 3D parts resulting from the partitioning 52 and from the data representative of the geometry (e.g. coordinates) of the points comprised in the 3D parts, as described with regard to frame i. As the number of 3D parts resulting from the partitioning 52 is less than the number of 3D parts resulting from the partitioning 51, the number of color maps in the second patch atlas 56 is less than the number of depth maps comprised in the second patch atlas 54.

Figure 6:
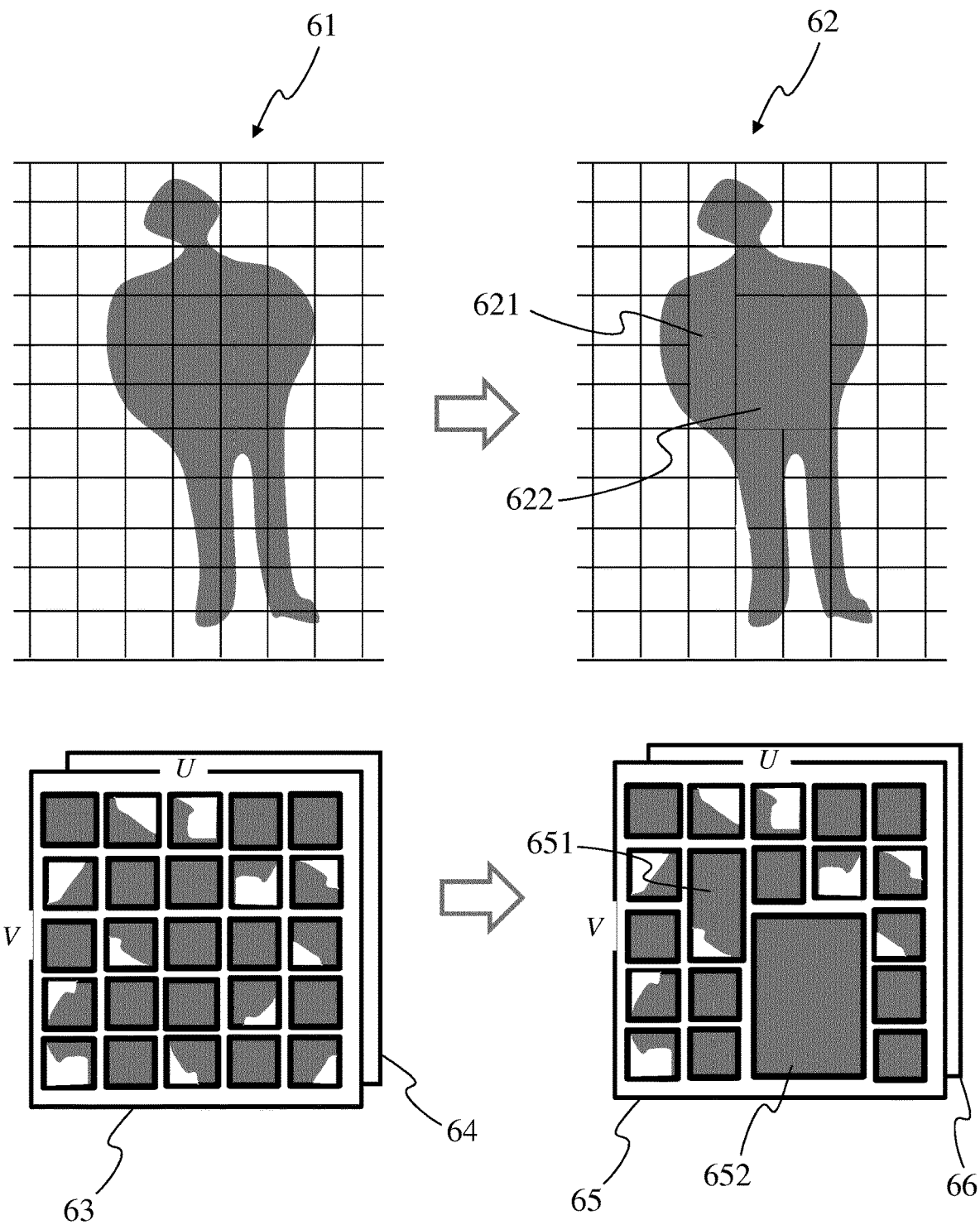

FIG. 6 shows further non-limiting examples of first or second patch atlas associated with 3D parts of the point cloud representing the object 5. FIG. 6 shows a first partitioning 61 of the point cloud corresponding for example to the partitioning 51 of FIG. 5 and a second partitioning 62 of the same point cloud. A first patch atlas 63 is generated from the first partitioning 61, the first patch atlas 63 comprising the depth maps obtained from the 2D parametrizations associated with the 3D parts resulting from the partitioning 61. A second patch atlas 64 is generated from the first partitioning 61, the second patch atlas 64 comprising the color maps obtained from the 2D parametrizations associated with the 3D parts resulting from the partitioning 61.

The second partitioning 62 is different from the first partitioning 61 in the sense that some of the 3D parts of the first partitioning 61 have been grouped into a single 3D part of the second partitioning 62. For example, 6 3D parts of the first partitioning 61 representing the torso of the person have been grouped to form one 3D part 622 in the second partitioning 62. In a same way, 4 3D parts of the first partitioning 61 representing part of the shoulder and arm of the person have been grouped to form one 3D part 621 in the second partitioning 62. The 3D parts are for example grouped according to the geometrical characteristics associated with the points of the point cloud comprised in the 3D parts. For example, 3D parts may be grouped together when the implicit surface obtained from the points comprised in each of these 3D parts have a similar topology, e.g. normal close to each other and/or range of associated depth value close to each other.

A first patch atlas 65 is generated from the second partitioning 62, the first patch atlas 65 comprising the depth maps obtained from the 2D parametrizations associated with the 3D parts resulting from the second partitioning 62. As illustrated on FIG. 6, the shape and number of depth maps in the first patch atlas 65 is different from the shape and number of depth maps in the first patch atlas 63. Some of the depth maps 651, 652 associated with the 2D parametrizations of the 3D parts 621, 622 are different in size in comparison to the corresponding depth maps in the first patch atlas 63. In a same way, a second patch atlas 66 is generated from the second partitioning 62, the second patch atlas 66 comprising the color maps obtained from the 2D parametrizations associated with the 3D parts resulting from the second partitioning 62. The number of color maps in the second patch atlas 66 is less than the number of color maps in the second patch atlas 64 following the grouping of 3D parts of the first partitioning 61 to obtain the second partitioning 62. This grouping allows to reduce the number of patches, and therefore the number of sharp frontiers and high spatial frequency information. Reducing this lowers the compression bit rate of the color and depth maps.

Figure 7:
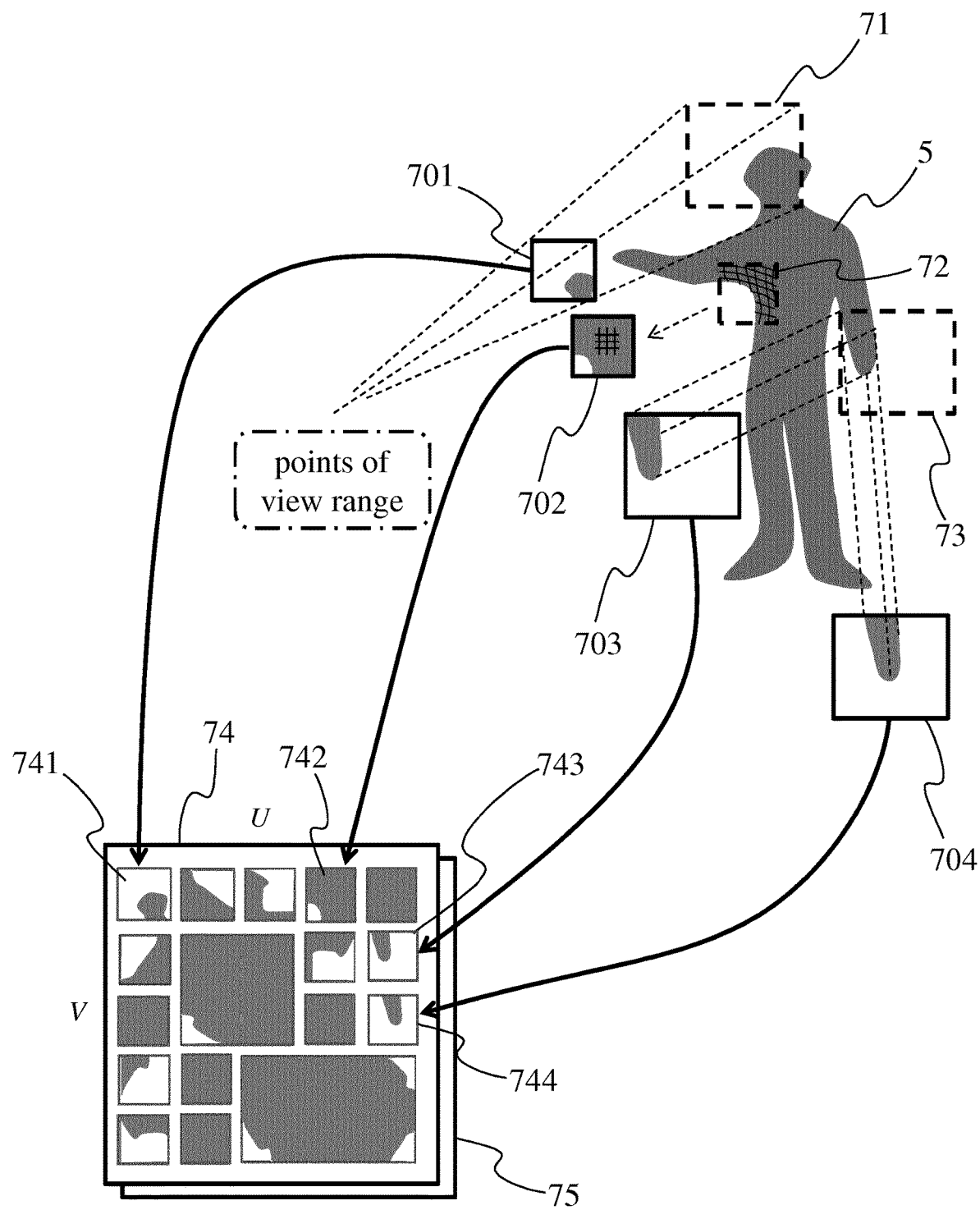
FIG. 7 shows the generation of the patch atlas of FIGS. 5 and 6, according to a non-limiting embodiment of the present principles.

FIG. 7 illustrates the generation of first and second patch atlas from 3D parts of a point cloud representing the object 5, according to a non-limiting example of the present principles.

The point cloud representing the object 5 is partitioned into a plurality of 3D parts, e.g. 50, 100, 1000 or more 3D parts, 3 of them being illustrated on FIG. 7, i.e. the 3D parts 71, 72 and 73, the 3D part 71 comprising points of the point cloud representing part of the head of the person, the 3D part 72 comprising points of the point cloud representing an armpit of the person and the 3D part 73 comprising points of the point cloud representing a hand of the person. One or more 2D parametrizations of each 3D part or of a part of the 3D parts are generated to represent each 3D part in two dimensions. For example, a 2D parametrization 701 is obtained for the 3D part 71, a 2D parametrization 702 is obtained for the 3D part 72 and 2 different 2D parametrizations 703 and 704 are obtained for the 3D part 73. The 2D parametrization may vary from a 3D part to another one. For example, the 2D parametrization 701 associated with the 3D part 71 is a linear perspective projection while the 2D parametrization 702 associated with the 3D part 72 is a LLE and the 2D parametrizations 703 and 704 associated with the 3D part 73 are both orthographic projections according to different points of view. All point of views used to obtain the 2D parametrizations are chosen to be located within the range of points of view of the acquisition device used to obtain the images of the object 5 and to obtain the associated point cloud. According to a variant, all 2D parametrizations associated with all 3D parts are of the same type, e.g. a linear perspective projection or an orthographic projection. According to a variant, different 2D parametrizations may be used for a same 3D part. A first patch atlas 74 collecting the depth maps associated with the obtained 2D parametrizations is generated as explained with regard to FIGS. 5 and 6. The first patch atlas comprises a depth map 741 associated with the 2D parametrization 701, a depth map 742 associated with the 2D parametrization 702, a depth map 743 associated with the 2D parametrization 703 and a depth map 744 associated with the 2D parametrization 704, among other depth maps. A second patch atlas 75 collecting the color maps associated with the obtained 2D parametrizations is generated as explained with regard to FIGS. 5 and 6.

The choice of 2D parametrization for each 3D part is for example based on an optimization process, for example to reduce the number of maps in the first and second patch atlas, and/or to minimize the points of the 3D part which would be lost during the 3D to 2D transformation process.

Each depth or color map has advantageously a rectangular shape so as to ease the packing process on the first patch atlas and the second patch atlas.

The depth maps and color maps in respectively the first patch atlas and the second patch atlas will be separated by a border which will be discarded at the decoder side, in order to get rid of compression artefacts occurring at sharp visual frontiers. The exact part of information to retrieve for the depth and color maps at decoder side for the regeneration of the point cloud, e.g. the depth/color map's width and height, is provided by some of the 2D parametrization parameters, like for example the parameters giving the span in 2 dimensions of the projection surface expressed in pixel in the case of linear or orthographic perspective projection.

According to a variant, the first patch atlas and the second patch atlas form a single patch atlas, the mapping information comprising information enables to retrieve a depth map and a color map that are associated with the same 3D part.

FIG. 12 illustrates a method for generating a stream comprising data representative of an object of a scene implemented for example in a device 9 (described with regard to FIG. 9), according to a non-restrictive embodiment of the present principles.

In a step 1200, the different parameters of the device 9 are updated. In particular, the data associated with the representation of the object are initialised in any way.

In an operation 1201, a 3D point cloud representing the object as seen from a range of points of view is partitioned into a plurality of 3D parts, e.g. 5, 10, 50, 100, 1000 or more 3D parts, each comprising one or more points of the 3D point cloud. The data associated with the points of the 3D point cloud representing the object (or part of the object) is obtained, i.e. for example received from a memory device, such as the local memory of the device 9 or a remote storage device such as a server (e.g. via a network such as the Internet, or a Local Area Network). According to another example, the data is received from one or more acquisition devices used to acquire one or more views of the scene comprising the object. The data comprises for example color information (or texture information) and distance information (e.g., depth or height corresponding to the distance between the considered point and the point of view associated with the considered point, i.e. the point of view of the acquisition device used to acquire the considered point).

In an operation 1202, a first patch atlas comprising a collection of depth maps is determined from parameters representative of 2D parametrizations that are each associated with one 3D part of the 3D point cloud and from geometrical information associated with the points comprised in the 3D part the 2D parametrization is associated with. Each depth map corresponds to a patch of the first patch atlas and is associated with one 2D parametrization of one 3D part of the point cloud. The 2D parametrization associated with a 3D part is a 2D pixel/sample representation of the 3D implicit surface obtained from the geometrical data associated with the points comprised in said 3D part, the location of the 2D parametrization in the space of the object and the point of view associated with the 2D parametrization being according to the pose information associated with the range of points of view from which the point cloud is seen. The 2D parametrization is located in such a way to be between the surface of the object represented by the point cloud and the range of points of view, i.e. the 2D surface obtained with the 2D parametrization faces the 3D part it is associated with. One or more 2D parametrizations are generated for each 3D part or for each 3D part of a part only of the point cloud. One depth map is generated for each generated 2D parametrization and the thus generated depth maps are collected in an image and arranged under the form of a first patch atlas. When data is associated with pixels of the first patch atlas, this data corresponds to distance or depth information. Some pixels of the first patch atlas have no information associated with them, for example for the pixels located between two patches.

In an operation 1203, a second patch atlas comprising a collection of color maps is determined from parameters representative of the 2D parametrizations that are each associated with one 3D part of the 3D point cloud and from geometrical information associated with the points comprised in the 3D part the 2D parametrization is associated with. Each color map corresponds to a patch of the second patch atlas and is associated with one 2D parametrization of one 3D part of the point cloud. One color map is generated for each generated 2D parametrization and the thus generated color maps are collected in an image and arranged under the form of a second patch atlas. When data is associated with pixels of the second patch atlas, this data corresponds to color (e.g., Red, Green, Blue or Cyan, Magenta, Yellow, Black) information. Some pixels of the first patch atlas have no information associated with them, for example for the pixels located between two patches.

A different depth map of the first patch atlas and a different color map of the second patch atlas are associated with each 2D parametrization corresponding to one 3D part of the point cloud. A depth map and a color map associated with a given 2D parametrization are arranged at a same location (e.g. same row, same column) in respectively the first patch atlas and the second patch atlas. According to a variant, a depth map and a color map associated with a given 2D parametrization are arranged at a different location (described for example with a row index and column index) in respectively the first patch atlas and the second patch atlas.

In an operation 1204, a data stream comprising the data representative of the first patch atlas, the data representative of the second patch atlas, the parameters representative of the 2D parametrization and first mapping information is generated. The first mapping information enables to retrieve correspondence information between a 2D parametrization and its associated depth map and color map in respectively the first patch atlas and the second patch atlas.

FIG. 13 illustrates a method of obtaining data representative of a point cloud representative of the object from the stream obtained with the method of FIG. 12. The method is for example implemented in a device 9 (described with regard to FIG. 9), according to a non-restrictive embodiment of the present principles.

In an operation 1300, the different parameters of the device 9 are updated. In particular, the data associated with the representation of the at least a part of the object are initialised in any way.

In an operation 1301, parameters representative of each 2D parametrization are obtained from the data stream, an example of the structure of such a stream being described with regard to FIG. 11.

In an operation 1302, data representative of a first patch atlas comprising depth maps associated with the 2D parametrizations obtained at step 1301 is obtained from the data stream. The data representative of the first patch atlas corresponds for example to the data obtained at operation 1202.

In an operation 1303, data representative of a second patch atlas comprising color maps associated with the 2D parametrizations obtained at step 1301 is obtained from the data stream. The data representative of the second patch atlas corresponds for example to the data obtained at operation 1203.

In an operation 1304, data associated with points of a point cloud are obtained from the parameters of the 2D parametrizations obtained at operation 1301, the data of the first patch atlas obtained at operation 1302 and the data of the second patch atlas obtained at step 1303, the association of a given 2D parametrization and its corresponding depth map in the first patch atlas and corresponding color map in the second patch atlas being obtained from a first mapping information comprised in the data stream. The points are obtained by performing the inverse operation than the one used to obtain the 2D parametrization (e.g. deprojection or inverse LLE) to the samples/pixels of the 2D surface obtained with the 2D parametrization.

In an optional operation, an image of the object represented with the 2D parametrizations and associated first patch atlas and second patch atlas is rendered from a point of view that is constrained by the position information that may be comprised in the stream 1100, the position information corresponding for example to the range of points of view from which the point cloud is seen. The external surface of the object may for example be obtained by applying a splat rendering technique to the points of the obtained point cloud. In a variant, a sequence of images is rendered when the stream comprises information representative of the object or part of it for a sequence of frames (i.e. images).

FIG. 9 shows an exemplary architecture of a device 9 which may be configured to implement a method described in relation with FIGS. 12 and/or 13.

The device 9 comprises following elements that are linked together by a data and address bus 91:
- a microprocessor 92 (or CPU), which is, for example, a DSP (or Digital Signal Processor);
- a ROM (or Read Only Memory) 93;
- a RAM (or Random Access Memory) 94;
- a storage interface 95;
- an I/O interface 96 for reception of data to transmit, from an application; and
- a power supply, e.g. a battery.

In accordance with an example, the power supply is external to the device. In each of mentioned memory, the word «register» used in the specification can correspond to area of small capacity (some bits) or to very large area (e.g. a whole program or large amount of received or decoded data). The ROM 93 comprises at least a program and parameters. The ROM 93 may store algorithms and instructions to perform techniques in accordance with present principles. When switched on, the CPU 92 uploads the program in the RAM and executes the corresponding instructions.

The RAM 94 comprises, in a register, the program executed by the CPU 92 and uploaded after switch on of the device 9, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder, the first, second, third and/or fourth syntax elements are obtained from a source. For example, the source belongs to a set comprising:
- a local memory (93 or 94), e.g. a video memory or a RAM (or Random Access Memory), a flash memory, a ROM (or Read Only Memory), a hard disk;
- a storage interface (95), e.g. an interface with a mass storage, a RAM, a flash memory, a ROM, an optical disc or a magnetic support;

a communication interface (96), e.g. a wireline interface (for example a bus interface, a wide area network interface, a local area network interface) or a wireless interface (such as a IEEE 802.11 interface or a Bluetooth® interface); and a user interface such as a Graphical User Interface enabling a user to input data.

In accordance with examples of the decoding or decoder(s), the first, second and/or third information are sent to a destination; specifically, the destination belongs to a set comprising:

a local memory (93 or 94), e.g. a video memory or a RAM, a flash memory, a hard disk;

a storage interface (95), e.g. an interface with a mass storage, a RAM, a flash memory, a ROM, an optical disc or a magnetic support; and a communication interface (96), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, a bitstream comprising data representative of the object is sent to a destination. As an example, the bitstream is stored in a local or remote memory, e.g. a video memory (94) or a RAM (94), a hard disk (93). In a variant, the bitstream is sent to a storage interface (95), e.g. an interface with a mass storage, a flash memory, ROM, an optical disc or a magnetic support and/or transmitted over a communication interface (96), e.g. an interface to a point to point link, a communication bus, a point to multipoint link or a broadcast network.

In accordance with examples of decoding or decoder or renderer, the bitstream is obtained from a source. Exemplarily, the bitstream is read from a local memory, e.g. a video memory (94), a RAM (94), a ROM (93), a flash memory (93) or a hard disk (93). In a variant, the bitstream is received from a storage interface (95), e.g. an interface with a mass storage, a RAM, a ROM, a flash memory, an optical disc or a magnetic support and/or received from a communication interface (95), e.g. an interface to a point to point link, a bus, a point to multipoint link or a broadcast network.

In accordance with examples, the device 9 is configured to implement a method described in relation with FIG. 12, and belongs to a set comprising:

a mobile device;
a communication device;
a game device;
a tablet (or tablet computer);
a laptop;
a still picture camera;
a video camera;
an encoding chip;
a server (e.g. a broadcast server, a video-on-demand server or a web server).

In accordance with examples, the device 9 is configured to implement a rendering method described in relation with FIG. 13, and belongs to a set comprising:

a mobile device;
a communication device;
a game device;
a set top box;
a TV set;
a tablet (or tablet computer);
a laptop; and
a display (such as a HMD for example).

In accordance with an example illustrated in FIG. 10, in a transmission context between two remote devices 1001 and 1002 (of the type of the device 9) over a communication network NET 1000, the device 1001 comprises means which are configured to implement a method for generating a stream as described in relation with the FIG. 12, and the device 1002 comprises means which are configured to implement a method for rendering an image as described in relation with FIG. 13.

In accordance with an example, the network 1000 is a LAN or WLAN network, adapted to broadcast still pictures or video pictures with associated audio information from device 1001 to decoding/rendering devices including the device 1002.

FIG. 11 shows an example of an embodiment of the syntax of such a signal when the data are transmitted over a packet-based transmission protocol. FIG. 11 shows an example structure 1100 of an immersive video stream. The structure consists in a container which organizes the stream in independent syntax elements. The structure may comprise a header part 1101 which is a set of data common to every syntax elements of the stream. For example, the header part contains metadata about syntax elements, describing the nature and the role of each of them. The header part may also comprise the first mapping information, and optionally the second and third mapping information. The structure may comprise a payload comprising syntax elements 1102, 1103, 1104, the first syntax element 1102 being relative to the parameters defining the 2D parametrizations, the second syntax element being relative to the data representative of the first patch atlas and the third syntax element being relative to the data representative of the second patch atlas. The data representative of the first patch atlas may comprise information regarding the pixels that are comprised in each depth map (for example coordinates of a reference pixel of the depth map, e.g. coordinates of the top left pixel, with the width of the depth map expressed in number of pixels with the height of the depth map expressed in number of pixels). The data representative of the second patch atlas may comprise information regarding the pixels that are comprised in each color map (for example coordinates of a reference pixel of the color map, e.g. coordinates of the top left pixel, with the width of the depth map expressed in number of pixels and the height of the color map expressed in number of pixels). According to an optional variant, the data representative of the first patch atlas may further comprise information regarding the minimal and maximal depth values that are comprised in each depth map. The data representative of the second patch atlas may further comprise information regarding the minimal and maximal color values that are comprised in each color map.

For illustration purpose, in the context of ISOBMFF file format standard, color map, depth map and the metadata would typically be referenced in ISOBMFF tracks in a box of type MOOV, with color map and depth map data themselves embedded in media-data box of type mdat.

Naturally, the present disclosure is not limited to the embodiments previously described.

In particular, the present disclosure is not limited to a method and device for generating a stream but also extends to a method for encoding/decoding a packet comprising data representative of an object of a scene and to any device implementing this method and notably any devices comprising at least one CPU and/or at least one GPU.

The present disclosure also relates to a method (and a device configured) for displaying images rendered from the data stream comprising the information representative of the object of the scene and to a method (and a device configured) for rendering and displaying the object with a flat video.

The present disclosure also relates to a method (and a device configured) for transmitting and/or receiving the stream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of generating a stream, the method comprising:
    partitioning a three-dimensional point cloud in a plurality of three-dimensional parts each comprising at least a point of the three-dimensional point cloud;
    for each of said three-dimensional parts:
        determining a depth map of said three-dimensional part according to parameters representative of a two-dimensional parametrization responsive to geometric information associated with said at least a point and to pose information associated with a range of points of view; and
        determining a color map of said three-dimensional part according to said parameters;
    the plurality of determined depth maps being represented in a first patch atlas, each depth map corresponding to one patch of the first patch atlas, and the plurality of determined color maps being represented in a second patch atlas, each color map corresponding to one patch of the second patch atlas;
    generating said stream comprising the parameters representative of the two-dimensional parametrizations, data representative of the first patch atlas, data representative of the second patch atlas and a first mapping information representative of a mapping between said two-dimensional parametrizations and corresponding depth maps in the first patch atlas and corresponding color maps in the second patch atlas.

2. A device configured to generate a stream, the device comprising at least one processor and at least one memory having stored thereon instructions operative, when executed by the at least one processor to cause the device to:
    partition a three-dimensional point cloud in a plurality of three-dimensional parts each comprising at least a point of the three-dimensional point cloud;
    determine, for each of said three-dimensional parts:
        a depth map of said three-dimensional part according to parameters representative of a two-dimensional parametrization responsive to geometric information associated with said at least a point and to pose information associated with a range of points of view; and a color map of said three-dimensional part according to said parameters;

the plurality of determined depth maps being represented in a first patch atlas, each depth map corresponding to one patch of the first patch atlas, and the plurality of determined color maps being represented in a second patch atlas, each color map corresponding to one patch of the second patch atlas;

generate said stream comprising the parameters representative of the two-dimensional parametrizations, data representative of the first patch atlas, data representative of the second patch atlas and a first mapping information representative of a mapping between said two-dimensional parametrizations and corresponding depth maps in the first patch atlas and corresponding color maps in the second patch atlas.

3. The method according to claim 1, wherein a plurality of two-dimensional parametrizations is associated with each three-dimensional part of at least a part of said plurality of three-dimensional parts.

4. The method according to claim 1, wherein said stream further comprises a second mapping information representative of a mapping between an information identifying said three-dimensional patches and pixels of first and second images representative of respectively the first patch atlas and the second patch atlas.

5. The method according to claim 1, wherein the partitioning of said point cloud varies over time.

6. A method of obtaining a point cloud from a stream carrying data representative of said object, the method comprising:

obtaining, from said stream, parameters representative of two-dimensional parametrizations of three-dimensional parts of a point cloud;

obtaining, from said stream, data representative of a first patch atlas comprising a plurality of depth maps each associated with one of said two-dimensional parametrizations;

obtaining, from said stream, data representative of a second patch atlas comprising a plurality of color maps each associated with one of said two-dimensional parametrizations;

obtaining data associated with points of the point cloud from said parameters representative of the two-dimensional parametrizations, data of associated depth maps in the first patch atlas, data of associated color maps in the second patch atlas and first mapping information obtained from said stream and representative of a mapping between said two-dimensional parametrizations and corresponding depth maps and color maps in respectively said first patch atlas and said second patch atlas.

7. A device configured to obtain a point cloud from a stream carrying data representative of said object, the device comprising at least one processor and at least one memory having stored thereon instructions operative, when executed by the at least one processor, to cause the device to:

obtain, from said stream, parameters representative of two-dimensional parametrizations of three-dimensional parts of a point cloud;

obtain, from said stream, data representative of a first patch atlas comprising a plurality of depth maps each associated with one of said two-dimensional parametrizations;

obtain, from said stream, data representative of a second patch atlas comprising a plurality of color maps each associated with one of said two-dimensional parametrizations;

obtain data associated with points of the point cloud from said parameters representative of the two-dimensional parametrizations, data of associated depth maps in the first patch atlas, data of associated color maps in the second patch atlas and first mapping information obtained from said stream and representative of a mapping between said two-dimensional parametrizations and corresponding depth maps and color maps in respectively said first patch atlas and said second patch atlas.

8. The method according to claim 6, wherein a plurality of two-dimensional parametrizations is associated with each three-dimensional part of at least a part of the plurality of three-dimensional parts.

9. The method according to claim 6, wherein said stream further comprises a second mapping information representative of a mapping between the three-dimensional parts and pixels of first and second images representative of respectively the first patch atlas and the second patch atlas.

10. The method according to claim 6, wherein an image representative of the object is rendered according to the obtained data representative of the point cloud.

11. A non-transitory processor-readable storage medium having stored therein instructions that, when executed by a processor, cause the processor to:

partition a three-dimensional point cloud in a plurality of three-dimensional parts each comprising at least a point of the three-dimensional point cloud;

for each of said three-dimensional parts:
determine a depth map of said three-dimensional part according to parameters representative of a two-dimensional parametrization responsive to geometric information associated with said at least a point and to pose information associated with a range of points of view; and
determine a color map of said three-dimensional part according to said parameters;

the plurality of determined depth maps being represented in a first patch atlas, each depth map corresponding to one patch of the first patch atlas, and the plurality of determined color maps being represented in a second patch atlas, each color map corresponding to one patch of the second batch atlas;

generate said stream comprising the parameters representative of the two-dimensional parametrizations, data representative of the first patch atlas, data representative of the second patch atlas and a first mapping information representative of a mapping between said two-dimensional parametrizations and corresponding depth maps in the first patch atlas and corresponding color maps in the second patch atlas.

12. A non-transitory processor-readable storage medium having stored therein instructions that, when executed by a processor, cause the processor to:

obtaining, from said stream, parameters representative of two-dimensional parametrizations of three-dimensional parts of a point cloud;

obtaining, from said stream, data representative of a first patch atlas comprising a plurality of depth maps each associated with one of said two-dimensional parametrizations;

obtaining, from said stream, data representative of a second patch atlas comprising a plurality of color maps each associated with one of said two-dimensional parametrizations;

obtaining data associated with points of the point cloud from said parameters representative of the two-dimensional parametrizations, data of associated depth maps in the first patch atlas, data of associated color maps in the second patch atlas and first mapping information obtained from said stream and representative of a mapping between said two-dimensional parametrizations and corresponding depth maps and color maps in respectively said first patch atlas and said second patch atlas.

13. The device according to claim 2, wherein a plurality of two-dimensional parametrizations is associated with each three-dimensional part of at least a part of said plurality of three-dimensional parts.

14. The device according to claim 2, wherein said stream further comprises a second mapping information representative of a mapping between an information identifying said three-dimensional patches and pixels of first and second images representative of respectively the first patch atlas and the second patch atlas.

15. The device according to claim 2, wherein the partitioning of said point cloud varies over time.

16. The device according to claim 7, wherein a plurality of two-dimensional parametrizations is associated with each three-dimensional part of at least a part of the plurality of three-dimensional parts.

17. The device according to claim 7, wherein said stream further comprises a second mapping information representative of a mapping between the three-dimensional parts and pixels of first and second images representative of respectively the first patch atlas and the second patch atlas.

18. The device according to claim 7, wherein an image representative of the object is rendered according to the obtained data representative of the point cloud.

* * * * *

UNITED STATES PATENT AND TRADEMARK OFFICE
CERTIFICATE OF CORRECTION

PATENT NO. : 10,891,784 B2
APPLICATION NO. : 16/477620
DATED : January 12, 2021
INVENTOR(S) : Renaud Dore et al.

Page 1 of 1

It is certified that error appears in the above-identified patent and that said Letters Patent is hereby corrected as shown below:

In the Claims

Column 26, Line 61: replace "obtaining" with --obtain--.
Column 26, Line 64: replace "obtaining" with --obtain--.
Column 27, Line 1: replace "obtaining" with --obtain--.
Column 27, Line 5: replace "obtaining" with --obtain--.

Signed and Sealed this
Seventeenth Day of May, 2022

Katherine Kelly Vidal
*Director of the United States Patent and Trademark Office*